Jan. 14, 1964  G. F. MASIN  3,118,067
CIRCUIT FOR EFFECTIVELY ELIMINATING OPTICAL CROSS-TALK
INHERENT BETWEEN CHANNELS OF A MULTI-CHANNEL
OPTICAL DETECTING DEVICE
Filed Sept. 29, 1961

INVENTOR.
GEORGE F. MASIN
BY *F. M. Phillips*
*J. M. St. Amand*
ATTORNEYS

3,118,067
CIRCUIT FOR EFFECTIVELY ELIMINATING OPTICAL CROSS-TALK INHERENT BETWEEN CHANNELS OF A MULTI-CHANNEL OPTICAL DETECTING DEVICE

George F. Masin, Anaheim, Calif., assignor to the United States of America as represented by the Secretary of the Navy
Filed Sept. 29, 1961, Ser. No. 141,913
1 Claim. (Cl. 250—209)
(Granted under Title 35, U.S. Code (1952), sec. 266)

The invention herein described may be manufactured and used by or for the Government of the United States of America for governmental purposes without the payment of any royalties thereon or therefor.

The present invention relates to improvements in optical detecting devices wherein optical cross-talk is effectively eliminated where two or more channels are involved.

In many instances it is desirable to provide an optical detector assembly with two separate detector channels, each containing a detector with its associated optical components. To prevent light or radiation from being reflected (optical cross-talk) from one channel into another, special optical geometry and/or mechanical optical stops have been utilized. The main disadvantage of the past practice is that the fabrication of mirrors and stops can only achieve a degree of perfection limited by present day tooling and fabrication devices.

The present invention provides an electrical summing network common to each optical detector channel such that a signal in one channel caused by stray light entering from an adjacent channel is cancelled out.

Accordingly, an object of the present invention is to effectively eliminate the optical cross-talk inherent between channels of a multi-channel optical detecting device.

Another object is to effectively eliminate optical cross-talk which exists between channels of an optical detecting device by providing an electrical summing network common to all the channels for algebraically summing to effectively null the spurious signals.

Other objects and many of the attendant advantages of this invention will become readily appreciated as the same becomes better understood by reference to the following detailed description when considered in connection with the accompanying drawings wherein.

Figure 1:
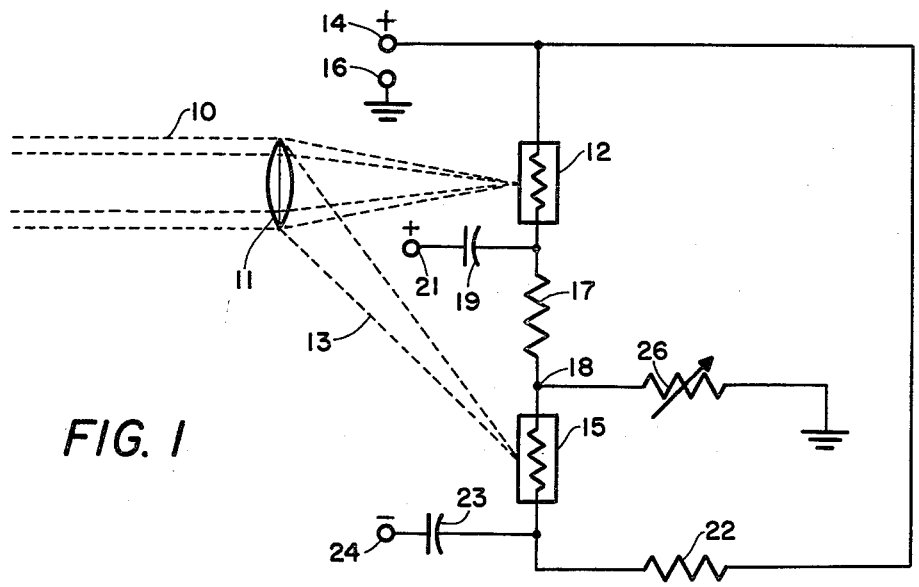
FIGURE 1 is a schematic diagram of one embodiment of the invention.

Referring now to the drawings wherein like reference characters designate like or corresponding elements throughout the different views, there is shown in FIGURE 1 a two channel optical detector for detecting a source of light radiation. A slit (not shown) is provided in the detecting device for each channel so that the energy from a light source will enter the slits successively as the detector moves in the direction of the light source to be detected. Rays of energy 10 emanating from the light source pass through condensing lens 11 and impinge on detector 12. Stray energy 13 from rays 10 impinges on adjacent detector 15. The operating potentials for the circuit elements are provided by terminals 14 and 16 of a bias supply, not shown. Detector 12 is connected in series with resistor 17 between positive terminal 14 of the bias source and a common junction 18. The output signal from this channel is taken from a point intermediate to detector 12 and resistor 17 and coupled by capacitor 19 to output terminal 21. Detector 15 is connected in series with resistor 22 between terminal 14 and common junction 18. The output signal from this channel is taken from a point intermediate to detector 15 and resistor 22 and coupled by capacitor 23 to output terminal 24. A variable resistor 26 is connected between junction 18 and the negative terminal 16 of the bias source through ground and is adjusted to provide a positive voltage drop with respect to junction 18 to add algebraically with the negative voltage drop caused by stray light 13 impinging on detector 15.

Figure 2:
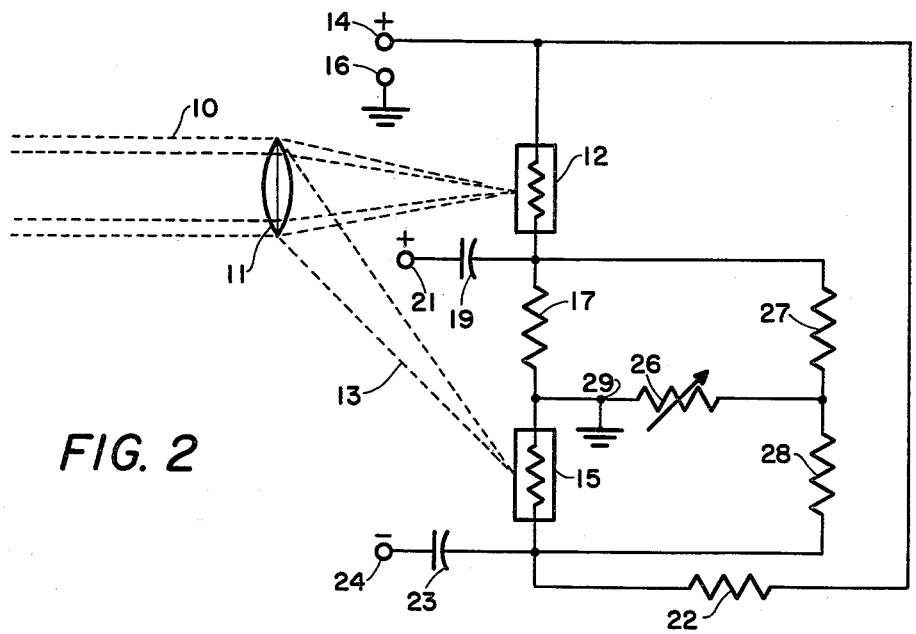
FIGURE 2 is a schematic diagram of a modification of the embodiment of FIGURE 1.

The modification shown in FIGURE 2 provides a resistor network connected between the outputs of detectors 12 and 15 consisting of resistors 27 and 28. Variable resistor 26 is connected between junction 29 and a point intermediate resistors 27 and 28. Junction 29 is the common return for the bias source. Again variable resistor 26 is adjusted to provide a voltage drop which will null the voltage drop produced by the stray light impinging on detector 15.

Obviously many modifications and variations of the present invention are possible in the light of the above teachings. It is therefore to be understood that within the scope of the appended claim the invention may be practiced otherwise than as specifically described.

What is claimed is:

In a multi-channel optical detecting device of the type wherein a light radiating source is successively detected by each of the channels, the combination comprising:

(a) a first detector channel having a detector element for generating a positive output signal in response to light rays impinging thereon, (b) said first detector having first and second terminals, the first of said terminals being connected to a source of bias voltage, said second terminal being coupled to a first output terminal, a first load resistor being connected in series between said second terminal and a common junction, (c) a second detector channel having a detector element for generating a negative output signal in response to light rays impinging thereon, (d) said second detector having first and second terminals, the first of said terminals of said second detector being connected to said common junction, said second terminal of said second detector being coupled to a second output terminal, a second load resistor being connected in series between said second terminal of said second detector and said source of said bias voltage, and (e) a variable resistor connected between said common junction and said voltage source for producing a voltage drop that is equal and opposite to a voltage generated in either channel by stray radiated energy caused by optical anomalies in said detecting device.

References Cited in the file of this patent
UNITED STATES PATENTS

| | | |
|---|---|---|
| 1,287,970 | Greinacher et al. | Dec. 17, 1918 |
| 1,807,602 | Radford et al. | June 2, 1931 |
| 2,219,676 | Barber | Oct. 29, 1940 |
| 2,227,562 | Underhill | Jan. 7, 1941 |
| 2,294,376 | Belar | Sept. 1, 1942 |
| 2,295,536 | Albersheim | Sept. 15, 1942 |
| 2,470,877 | Stuland | May 24, 1949 |
| 2,721,942 | Friel et al. | Oct. 25, 1955 |
| 2,774,961 | Orland | Dec. 18, 1956 |
| 2,939,361 | Hook | June 7, 1960 |
| 2,961,542 | Cartwright et al. | Nov. 22, 1960 |